(12) United States Patent
Hutter

(10) Patent No.: US 6,967,227 B1
(45) Date of Patent: Nov. 22, 2005

(54) CARBOXYESTER-MODIFIED VINYLIC POLYMERIC COMPOSITIONS

(75) Inventor: G. Frederick Hutter, Charleston, SC (US)

(73) Assignee: MeadWestvaco Corporation, Stamford, CT (US)

( * ) Notice: Subject to any disclaimer, the term of this patent is extended or adjusted under 35 U.S.C. 154(b) by 300 days.

(21) Appl. No.: 10/616,380

(22) Filed: Jul. 9, 2003

(51) Int. Cl.⁷ ............................................. C08G 63/48
(52) U.S. Cl. .................................. 525/54.44; 526/216
(58) Field of Search ...................... 525/54.44; 526/216

(56) References Cited

U.S. PATENT DOCUMENTS

| | | | |
|---|---|---|---|
| 2,447,367 A * | 8/1948 | Rust et al. ................ | 525/54.44 |
| 3,438,918 A * | 4/1969 | Arlt, Jr. et al. .............. | 524/513 |
| 3,480,578 A | 11/1969 | Witt | |
| 3,716,389 A | 2/1973 | Voskuil et al. | |
| 4,317,755 A | 3/1982 | Gregory | |
| 4,414,370 A | 11/1983 | Hamielec et al. | |
| 4,459,129 A | 7/1984 | Gooding et al. | |
| 4,529,787 A | 7/1985 | Schmidt et al. | |
| 4,546,160 A | 10/1985 | Brand et al. | |
| 4,812,508 A | 3/1989 | Makhlouf et al. | |
| 4,839,413 A | 6/1989 | Kiehlbauch et al. | |
| 5,008,329 A | 4/1991 | Abe et al. | |
| 5,116,945 A | 5/1992 | Osawa et al. | |
| 5,182,326 A | 1/1993 | LeBlanc et al. | |
| 5,216,064 A | 6/1993 | Rivera et al. | |
| 5,656,679 A | 8/1997 | Hutter | |
| 5,688,859 A * | 11/1997 | Schneider et al. .......... | 524/591 |
| 5,708,078 A * | 1/1998 | Bender et al. ........... | 525/54.42 |
| 5,830,957 A | 11/1998 | Walker et al. | |
| 5,965,647 A | 10/1999 | Catena et al. | |
| 6,172,149 B1 | 1/2001 | Shah et al. | |
| 6,429,247 B1 | 8/2002 | Shah et al. | |
| 6,433,052 B1 | 8/2002 | Shah et al. | |
| 6,437,033 B1 | 8/2002 | Shah et al. | |
| 6,503,971 B1 | 1/2003 | Shah et al. | |
| 6,734,280 B1 * | 5/2004 | Hutter ..................... | 528/339.5 |

FOREIGN PATENT DOCUMENTS

JP        00159867        6/2000

OTHER PUBLICATIONS

U.S. Appl. No. 10/192,277, Jul. 2002, Hutter et al.
U.S. Appl. No. 10/228,910, Aug. 2002, Hutter et al.
*Progress in Organic Coatings*, vol. 20, pp139-167 (1992).

* cited by examiner

*Primary Examiner*—Bernard Lipman
(74) *Attorney, Agent, or Firm*—Terry B. McDaniel; Daniel B. Reece, IV

(57) ABSTRACT

This invention relates to novel carboxyester-modified vinylic polymeric compositions and the process for preparing them. In particular, the invention relates to novel carboxyester-modified vinylic polymeric compositions which exhibit properties that make them useful as support resins for producing polymer latices which can be employed in the formulation of various water-based coatings and inks, particularly flexographic inks. More particularly, these carboxyester-modified vinylic polymeric compositions are produced by the addition polymerization reaction of vinylic monomers in the presence of adducts of hydroxyl-substituted fatty acids and carboxylic anhydrides.

24 Claims, No Drawings

CARBOXYESTER-MODIFIED VINYLIC POLYMERIC COMPOSITIONS

FIELD OF INVENTION

This invention relates to novel carboxyester-modified vinylic polymeric compositions and the process for preparing them. In particular, the invention relates to novel carboxyester-modified vinylic polymeric compositions which exhibit properties that make them useful as support resins for producing polymer latices which can be employed in the formulation of various water-based coatings and inks, particularly flexographic inks. More particularly, these carboxyester-modified vinylic polymeric compositions are produced by the addition polymerization reaction of vinylic monomers in the presence of adducts of hydroxyl-substituted fatty acids and carboxylic anhydrides.

BACKGROUND OF THE INVENTION

It is highly desirable that ink and overprint formulations utilized for graphic art applications possess certain high performance characteristics. As typical surfactant-based emulsion polymerization products do not have the desired rheology properties for such applications, it is common practice to add a support resin in place of, or in addition to, the surfactants. These water-soluble and alkali-soluble (at pHs of about 8) support resins are added to the emulsion polymerization reaction to improve the stability and rheological properties of the latex. Improved stability results from absorption of the support resin on the surface of the particles and the increased viscosity of the emulsion.

The traditional processes for producing polymeric support resins are well known (see generally U.S. Pat. Nos. 4,839,413 and 5,216,064, which are hereby incorporated by reference). Commonly a solution polymerization reaction is employed wherein styrenic monomer and acrylic acid is mixed with a hydrocarbon solvent, a polymerization initiator, and a chain transfer agent. Upon completion of the reaction, the solution is stripped of the solvent to yield the acrylic polymer. The polymer is then available for use as a support resin when dissolved in an ammoniacal water solution.

However, problems exist with these traditional methods of producing support resins. For example, these methods require the use of environmentally adverse hydrocarbon solvents. Moreover, as these solvents are not usable or desirable in water-based ink or overprint formulations, the solvents must be stripped from the resulting acrylic polymers (thereby causing a yield loss). This stripping step also adds expense to the process due to both the loss of yield and the energy consumed in performing the stripping.

U.S. Pat. No. 6,172,149, which is incorporated herein by reference, teaches the preparation of rosin-fatty acid vinylic polymer sizing compositions via a polymerization method which does not require the use of hydrocarbon solvents. However, a problem exists with the employment of such polymers as support resins for emulsion polymerizations in that the resultant polymer emulsions are relatively low in viscosity when compared to similar latices made with acrylic support resins produced by conventional techniques. These low viscosities render the latices unsuitable for certain applications, such as architectural paints and flexographic inks. A further disadvantage inherent in the use of both conventional acrylic support resins and the polymers taught in U.S. Pat. No. 6,172,149 lies in the fact that inks and coatings based on latices made with these resins commonly exhibit relatively low resistances to commercial cleaning formulations containing glycol ethers (such as FORMULA 409 available from the Clorox Co.) or alkaline chemicals. Resistance to these types of commercial cleaning formulations is highly desired, especially in inks employed in the printing of consumer packaging materials.

Therefore, an object of this invention is to solve these major problems by disclosing a method of producing carboxyester-modified vinylic polymeric compositions.

Another object of this invention is to disclose carboxyester-modified vinylic polymeric compositions which exhibit properties that make them useful as support resins in water-based graphic art ink and coating applications.

SUMMARY OF THE INVENTION

The objects of this invention are met via a method that employs carboxyesters formed by the reaction of hydroxyl-substituted fatty acids and carboxylic anhydrides to act as solvents in the polymerization reaction of acrylic and/or styrenic monomers, thereby producing carboxyester-modified vinylic polymer compositions which are useful as support resins in water-based ink and coating applications. As this method does not require the use of hydrocarbon solvents, the need for solvent stripping is eliminated. Also, when employed as support resins in emulsion polymerizations the resultant emulsions have relatively high viscosity and improved resistance to alkaline chemicals and glycol ethers.

DESCRIPTION OF THE PREFERRED EMBODIMENT

The method for producing carboxyester-modified vinylic polymeric compositions comprises reacting in a free-radical addition polymerization reaction:

(A) about 40.0% to about 80.0% by total weight of the reactants of a monomer mixture comprising:
  (1) about 15.0% to about 45.0% by total weight of the monomer mixture of a member selected from the group consisting of acrylic acid, methacrylic acid, fumaric acid, maleic anhydride, itaconic acid, and combinations thereof,
  (2) about 55.0% to about 85.0% by total weight of the monomer mixture of a member selected from the group consisting of non-carboxylic acid-containing vinylic monomers and combinations thereof,
  (3) a catalytic amount of polymerization initiator, and
  (4) up to about 4.0% by total weight of the monomer mixture of chain transfer agent; and
(B) about 20.0% to about 60.0% by total weight of the reactants of a mixture comprising:
  (1) about 40.0% to 100.0% of at least one carboxyester formed by the condensation of at least one hydroxyl-substituted fatty acid and at least one carboxylic anhydride; and
  (2) up to about 60.0% of at least one rosin;

at a temperature in the range of about 135° C. to about 240° C. to produce a carboxyester-modified vinylic polymeric composition having a weight average molecular weight in the range of about 4,000 to about 20,000 and an acid number in the range of about 160 to about 300.

A preferred method for producing carboxyester-modified vinylic polymeric compositions comprises reacting in a free-radical addition polymerization reaction:

(A) about 40.0% to about 80.0% by total weight of the reactants of a monomer mixture comprising:
   (1) about 20.0% to about 35.0% by total weight of the monomer mixture of a member selected from the group consisting of acrylic acid, methacrylic acid, fumaric acid, maleic anhydride, itaconic acid, and combinations thereof,
   (2) about 65.0% to about 80.0% by total weight of the monomer mixture of a member selected from the group consisting of non-carboxylic acid-containing vinylic monomers and combinations thereof,
   (3) a catalytic amount of polymerization initiator, and
   (4) up to about 2.0% by total weight of the monomer mixture of chain transfer agent; and
(B) about 20.0% to about 60.0% by total weight of the reactants of a mixture comprising:
   (1) about 60.0% to 100.0% of at least one carboxyester formed by the condensation of at least one hydroxyl-substituted fatty acid and at least one carboxylic anhydride; and
   (2) up to 40.0% of at least one rosin;

at a temperature in the range of about 145° C. to about 220° C. to produce a carboxyester-modified vinylic polymeric composition having a weight average molecular weight in the range of about 4,000 to about 20,000 and an acid number in the range of about 160 to about 300.

The carboxyester components function as solvents in the polymerization reaction of the acrylic monomers. Additionally, while a portion of the carboxyesters remain unreacted, some of the carboxyesters may become graft polymerized onto the acrylic polymer. The resulting carboxyester-modified vinylic polymer compositions have a weight average molecular weight in the range of about 4,000 to about 20,000; with the preferred molecular weights being in the range of about 5,000 to about 11,000.

Carboxyester-modified vinylic polymer compositions produced via the present method have an acid number in the range of about 160 to about 300. It is preferred that the carboxyester-modified vinylic polymer compositions have an acid number in the range of about 180 to about 280.

The free-radical addition polymerization reaction used to produce the carboxyester-modified vinylic polymeric composition is a melt polymerization reaction in which no water is employed. Reaction temperatures suitable for use in the present method are within the range of about 135° C. to about 240° C., with the preferred temperatures being in the range of about 145° C. to about 220° C.

From about 15.0% to about 45.0% (preferably from about 20.0% to about 35.0%) by total weight of the monomer mixture employed in the free-radical addition polymerization reaction is a member selected from the group consisting of acrylic acid, methacrylic acid, fumaric acid, maleic anhydride, itaconic acid, and combinations thereof.

From about 55.0% to about 85.0% (preferably from about 65.0% to about 80.0%) by total weight of the monomer mixture is non-carboxylic acid-containing vinylic monomers. Preferred non-carboxylic acid-containing vinylic monomers include, but are not limited to the following: styrene, substituted styrenes, acrylic esters, methacrylic esters, acrylamides, methacrylamides, acrylonitrile, methacrylonitrile, vinyl esters, vinyl chloride, vinylidene chloride, vinylpyridines, N-vinylamides, vinyl ethers, and combinations thereof.

Preferred substituted styrenes suitable for use in the present invention include, but are not limited to, the following: α-methylstyrene, m-methylstyrene, p-methylstyrene, p-tert-butylstyrene, chlorostyrenes, 3-chloromethylstyrene, 4-chloromethylstyrene, and combinations thereof.

Preferred acrylic esters suitable for use in the present invention include, but are not limited to, the following: methyl acrylate, ethyl acrylate, butyl acrylate, isobutyl acrylate, cyclohexyl acrylate, 2-ethylhexyl acrylate, isodecyl acrylate, lauryl acrylate, stearyl acrylate, isobornyl acrylate, benzyl acrylate, hydroxyethyl acrylate, hydroxypropyl acrylate, hydroxybutyl acrylate, methoxyethyl acrylate, ethoxyethyl acrylate, phenoxyethyl acrylate, tetrahydrofurfuryl acrylate, glycidyl acrylate, dimethylaminoethyl acrylate, diethylaminoethyl acrylate, and combinations thereof.

Preferred methacrylic esters suitable for use in the present invention include, but are not limited to, the following: methyl methacrylate, ethyl methacrylate, butyl methacrylate, isobutyl methacrylate, cyclohexyl methacrylate, 2-ethylhexyl methacrylate, isodecyl methacrylate, lauryl methacrylate, stearyl methacrylate, isobornyl methacrylate, benzyl methacrylate, hydroxyethyl methacrylate, hydroxypropyl methacrylate, methoxyethyl methacrylate, ethoxyethyl methacrylate, phenoxyethyl methacrylate, tetrahydrofurfuryl methacrylate, glycidyl methacrylate, dimethylaminoethyl methacrylate, diethylaminoethyl methacrylate, tert-butylaminoethyl methacrylate, acetoxyethyl methacrylate, and combinations thereof.

Preferred acrylamides suitable for use in the present invention include, but are not limited to, the following: acrylamide, N-methylolacrylamide, N-butoxyethylacrylamide, N,N-dimethylacrylamide, N-isopropylacrylamide, N-tert-butylacrylamide, N-tert-octylacrylamide, diacetone acrylamide, and combinations thereof.

Preferred methacrylamides suitable for use in the present invention include, but are not limited to, the following: methacrylamide, N-methylolacrylamide, N,N-dimethylacrylamide, and combinations thereof.

Preferred vinyl esters suitable for use in the present invention include, but are not limited to, the following: vinyl acetate, vinyl propionate, vinyl 2-ethylhexanoate, vinyl neodecanoate, vinyl stearate, and combinations thereof.

Preferred N-vinylamides suitable for use in the present invention include, but are not limited to, the following: N-vinylpyrrolidione, N-vinylcaprolactam, N-vinylformamide, N-vinylacetamide, and combinations thereof.

Preferred vinyl ethers suitable for use in the present invention include, but are not limited to, the following: methyl vinyl ether, ethyl vinyl ether, butyl vinyl ether, decyl vinyl ether, hydroxybutyl vinyl ether, and combinations thereof.

A catalytic amount of polymerization initiator is used in the free radical polymerization reaction. The amount of initiator employed commonly comprises from about 0.2% to about 5.0% (preferably from about 0.5% to about 2.0%) by total weight of the monomer mixture. Traditional free radical polymerization initiators (such as thermal initiators, redox initiators, and the like) are suitable for use in the polymerization reaction. The type of initiator suitable for use in the present invention is known in the art to depend upon the desired temperature for the reaction. Examples of suitable thermal initiators include, but are not limited to, the following: hydrogen peroxide, t-butyl hydroperoxide, di-t-butyl peroxide, benzoyl peroxide, benzoyl hydroperoxide, 2,4-dichlorobenzoyl peroxide, t-butyl peracetate, azobisisobutyronitrile, isopropyl peroxycarbonate, 2,2'-azobis[2-methyl-N-(2-hydroxyethyl)propionamide], 2,2'-azobis(N-butyl-2-methylpropionamide), 2,2'-azobis(N-cyclohexyl-2-methylpropionamide), and combinations thereof. Examples of suitable redox initiators include, but are not limited to, the following: cumene hydroperoxide-sodium metabisulfite, cumene hydroperoxide-iron (II) sulfate, and combinations thereof.

Where desired, a chain transfer agent may be employed in the present method. Chain transfer agents which are suitable for use in the above reaction include, but are not limited to, the following: dodecyl mercaptan, mercaptoacetic acid, mercaptopropionic acid, mercaptosuccinic acid, octyl mercaptan, 2-mercaptoethanol, and combinations thereof. Where employed, it is preferred to use an amount of chain transfer agent in the range of from about 0.5% to about 2.0% by total weight of the monomer mixture of chain transfer agent.

The carboxyester component consists of a compound or mixture of compounds that is obtained by reacting at least one hydroxyl-substituted fatty acid and at least one carboxylic anhydride to form ester linkage between the hydroxyl and anhydride groups.

Suitable hydroxyl-substituted fatty acids include members selected from the group consisting of saturated carboxylic acids containing at least one carboxyl group, from one to about three hydroxyl groups, and from 8 to about 24 carbon atoms, unsaturated carboxylic acids containing at least one carboxyl group, from one to about three hydroxyl groups, and from 8 to about 24 carbon atoms, and combinations thereof. Typical examples include, but are not limited to, the following: 12-hydroxystearic acid, ricinoleic acid, dihydroxystearic acids, aleuritic acid, and mixtures thereof. The preferred hydroxyl-substituted fatty acid is 12-hydroxystearic acid.

Suitable carboxylic anhydrides include members selected from the group consisting of aliphatic compounds containing from one to about three cyclic anhydride groups, cycloaliphatic compounds containing from one to about three cyclic anhydride groups, aromatic compounds containing from one to about three cyclic anhydride groups, and combinations thereof. Typical examples include, but are not limited to, the following: phthalic anhydride, tetrahydrophthalic anhydride, hexahydrophthalic anhydride, trimellitic anhydride, pyromellitic dianhydride, benzophenonetetracarboxylic dianhydride, norbornenedicarboxylic anhydride, naphthalenedicarboxylic anhydride, succinic anhydride, alkyl-substituted succinic anhydrides, alkenyl-substituted succinic anhydrides, and mixtures thereof.

The ratio of hydroxyl-substituted fatty acid to carboxylic anhydride employed in the condensation reaction to produce the carboxyester(s) is preferably in the range of about 0.3 to about 1.2 equivalents of anhydride groups per equivalent of hydroxyl groups, with the more preferred ratio being in the range of about 0.5 to about 1.1 equivalents of anhydride groups per equivalent of hydroxyl groups.

The condensation (i.e., esterification) reaction between the hydroxyl-substituted fatty acid(s) and the carboxylic anhydride(s) is preferably carried out by heating these compounds together with stirring for from about one to about four hours at about 140° C. to about 200° C., more preferably from about 160° C. to about 190° C.

Rosins which are suitable for use in the present invention include members selected from the group consisting of tall oil rosin, formaldehyde-treated tall oil rosin, disproportionated tall oil rosin, hydrogenated tall oil rosin, gum rosin, formaldehyde-treated gum rosin, disproportionated gum rosin, hydrogenated gum rosin, wood rosin, formaldehyde-treated wood rosin, disproportionated wood rosin, hydrogenated wood rosin, and combinations thereof.

Where desired, a small amount of at least one bleaching agent can be added to prevent the formation of color bodies during the esterification and polymerization reactions, but it is not essential to the practice of the invention. Any compatible bleaching agent (such as hypophosphorous acid and the like) or combination of bleaching agents can be utilized.

The preferred method of carrying out the free-radical addition polymerization reaction of the current invention is to charge a reaction vessel with the carboxyester reaction product made from the hydroxyl-substituted fatty acid and the carboxylic anhydride and then heat the contents of the reaction vessel with stirring to a temperature in the range of about 135° C. to about 240° C. (preferably about 145° C. to about 220° C.). The vinylic monomers, initiator, and optional chain transfer agent are then added to the reaction vessel continuously over a period of about one to about five hours (preferably about two to about four hours). After the monomer addition is complete, the reaction is continued at the specified temperature for up to an additional five hours (preferably an additional one to three hours) to complete the addition polymerization reaction.

The resulting polymeric compositions can be used as support resins for the free-radical emulsion polymerization of vinylic monomers by methods that are well known in the art to produce latices that are useful as binders for inks (particularly flexographic inks) and other coatings. The latices thus produced show higher viscosities, lower residual monomer levels, and increased resistance to alkaline chemicals and glycol ethers in their dried state when compared with comparable latices made with support resins that do not contain the carboxyester(s).

Water-based inks and other coatings can be formulated by employing a latex comprising as a support resin an aqueous solution of the instant carboxyester-modified vinylic polymeric compositions with desired pigment. As used herein the term "pigment" refers to a water-insoluble colorant. Any pigment that is compatible with water-based inks may be employed in the practice of the invention. It is well within the ability of one skilled in the art to employ the carboxyester-modified vinylic polymeric compositions taught herein to produce such latexes, inks, and coatings.

The carboxyester-modified vinylic polymeric compositions may also be employed to formulate aqueous varnishes for use on substrates such as wood, concrete, brick, masonry, and the like. Where desired, pigment can be added to the varnish in order to formulate aqueous paints for use on these substrates. Any pigment that is compatible with aqueous paints may be employed in the practice of the invention. It is well within the ability of one skilled in the art to employ the carboxyester-modified vinylic polymeric compositions taught herein to produce such sealants and paints.

The following examples are provided to further illustrate the present invention and are not to be construed as limiting the invention in any manner.

EXAMPLE 1

A carboxyester was prepared as follows. A mixture of 181 grams of commercial 12-hydroxystearic acid (available from Acme-Hardesty Corp.) and 74 grams of phthalic anhydride were charged to a 500-ml round bottomed flask equipped with a stirrer, a heating mantle, and a nitrogen inlet. The charge was heated to 180° C. and stirred under a nitrogen blanket for two hours to produce a clear, resinous carboxyester.

EXAMPLE 2

A carboxyester-modified vinylic polymeric composition was prepared as follows. To a 500-ml round bottom flask equipped with a stirrer, heating mantle, reflux condenser, and addition funnel was charged 71.8 grams of the carboxyester of example 1, 37.5 grams of rosin SS (a tall oil rosin available from by Mead Westvaco Corp.), and 0.07 g of hypophosphorous acid. The charge was heated with stirring to 175° C., and the addition of a monomer mixture consisting of 74.9 g of styrene, 74.9 g of α-methylstyrene, 92.4 g of acrylic acid, and 3.76 g of di-tert-butyl peroxide was started. The monomer mixture was added over two hours, during which time the temperature of the batch was increased to 180° C. After the monomer addition was complete, stirring was continued for an additional hour at 180° C. Then an additional 0.39 g of di-tert-butyl peroxide was charged, and stirring was continued for an additional two hours at 190° C. to complete the polymerization reaction. The carboxyester-modified vinylic polymeric composition obtained upon cooling of the reaction mass (hereinafter referred to as "Polymer No. 1") had a ring-and-ball softening point of 138° C., an acid number of 244, and a weight average molecular weight of 7960.

EXAMPLE 3

A carboxyester was prepared as follows. A mixture of 181 grams of commercial 12-hydroxystearic acid (available from Acme-Hardesty Corp.) and 96 grams of trimellitic anhydride were charged to a 500-ml round bottomed flask equipped with a stirrer, a heating mantle, and a nitrogen inlet. The charge was heated to 180° C. and stirred under a nitrogen blanket for two hours to produce a clear, resinous carboxyester.

EXAMPLE 4

A carboxyester-modified vinylic polymeric composition was prepared as follows. To a 500-ml round bottom flask equipped with a stirrer, heating mantle, reflux condenser, and addition funnel was charged 71.6 g of the carboxyester of example 3, 37.5 g of SS rosin (a tall oil rosin available from MeadWestvaco Corp.), and 0.07 g of hypophosphorous acid. The charge was heated with stirring to 175° C., and the addition of a monomer mixture consisting of 74.9 g of styrene, 74.9 g of α-methylstyrene, 92.4 g of acrylic acid, and 3.76 g of di-tert-butyl peroxide was started. The monomer mixture was added over two hours at 175° C. After the monomer addition was complete, stirring was continued for an additional hour during which time the temperature was increased to 180° C. Then an additional 0.39 g of di-tert-butyl peroxide was charged, and stirring was continued for an additional two hours to complete the polymerization reaction. The carboxyester-modified vinylic polymeric composition obtained upon cooling of the reaction mass (hereinafter referred to as "Polymer No. 2") had a ring-and-ball softening point of 142° C., an acid number of 278, and a weight average molecular weight of 6730.

EXAMPLE 5

A carboxyester was prepared as follows. A mixture of 90.5 grams of commercial 12-hydroxystearic acid (available from Acme-Hardesty Corp.) and 40.3 grams of benzophenonetetracarboxylic dianhydride were charged to a 500-ml round bottomed flask equipped with a stirrer, a heating mantle, and a nitrogen inlet. The charge was heated to 180° C. and stirred under a nitrogen blanket for two hours to produce a clear, resinous carboxyester.

EXAMPLE 6

A carboxyester-modified vinylic polymeric composition was prepared as follows. To a 500-ml round bottom flask equipped with a stirrer, heating mantle, reflux condenser, and addition funnel was charged 71.6 g of the carboxyester of example 5, 37.5 g of SS rosin (a tall oil rosin available from MeadWestvaco Corp.) and 0.07 g of hypophosphorous acid. The charge was heated with stirring to 175° C., and the addition of a monomer mixture consisting of 74.9 g of styrene, 74.9 g of α-methylstyrene, 92.4 g of acrylic acid, and 3.76 g of di-tert-butyl peroxide was started. The monomer mixture was added over two hours, during which time the temperature of the batch was increased to 180° C. After the monomer addition was complete, stirring was continued for an additional hour at 180° C. Then an additional 0.39 g of di-tert-butyl peroxide was charged, and stirring was continued for an additional two hours at 185° C. to complete the polymerization reaction. The carboxyester-modified vinylic polymeric composition obtained upon cooling of the reaction mass (hereinafter referred to as "Polymer No. 3") had a ring-and-ball softening point of 144° C., an acid number of 259, and a weight average molecular weight of 7930.

EXAMPLE 7

A carboxyester was prepared as follows. A mixture of 90.5 grams of commercial 12-hydroxystearic acid (available from Acme-Hardesty Corp.) and 66.6 grams of dodecenylsuccinic anhydride were charged to a 500-ml round bottomed flask equipped with a stirrer, a heating mantle, and a nitrogen inlet. The charge was heated to 180° C. and stirred under a nitrogen blanket for two hours to produce a clear, resinous carboxyester.

EXAMPLE 8

A carboxyester-modified vinylic polymeric composition was prepared as follows. To a 500-ml round bottom flask equipped with a stirrer, heating mantle, reflux condenser, and addition funnel was charged 71.6 g of the carboxyester of example 7, 37.5 g of SS rosin (a tall oil rosin available from MeadWestvaco Corp.), and 0.07 g of hypophosphorous acid. The charge was heated with stirring to 170° C., and the addition of a monomer mixture consisting of 74.9 g of styrene, 74.9 g of α-methylstyrene, 92.4 g of acrylic acid, and 3.76 g of di-tert-butyl peroxide was started. The monomer mixture was added over two hours, during which time the temperature was gradually increased to 180° C. After the monomer addition was complete, stirring was continued for an additional hour, during which time the temperature was gradually increased to 185° C. Then an additional 0.39 g of di-tert-butyl peroxide was charged, and stirring was continued for an additional two hours at 185° C. to complete the polymerization reaction. The carboxyester-modified vinylic polymeric composition obtained upon cooling of the reaction mass (hereinafter referred to as "Polymer No. 4") had a ring-and-ball softening point of 142° C. and an acid number of 256, and a weight average molecular weight of 8470.

EXAMPLE 9

A carboxyester was prepared as follows. A mixture of 181 grams of commercial 12-hydroxystearic acid (available from Acme-Hardesty Corp.) and 54.5 grams of pyromellitic dianhydride were charged to a 500-ml round bottomed flask equipped with a stirrer, a heating mantle, and a nitrogen inlet. The charge was heated to 180° C. and stirred under a nitrogen blanket for two hours to produce a clear, resinous carboxyester.

EXAMPLE 10

A carboxyester-modified vinylic polymeric composition was prepared as follows. To a 500-ml round bottom flask equipped with a stirrer, heating mantle, reflux condenser, and addition funnel was charged 71.6 g of the carboxyester of example 8, 37.5 g of SS rosin (a tall oil rosin available from MeadWestvaco Corp.), and 0.07 g of hypophosphorous acid. The charge was heated with stirring to 170° C., and the addition of a monomer mixture consisting of 74.9 g of styrene, 74.9 g of α-methylstyrene, 92.4 g of acrylic acid, and 3.76 g of di-tert-butyl peroxide was started. The monomer mixture was added over two hours, during which time the temperature was gradually increased to 175° C. After the monomer addition was complete, stirring was continued for an additional hour, during which time the temperature was gradually increased to 185° C. Then an additional 0.39 g of di-tert-butyl peroxide was charged, and stirring was continued for an additional two hours at 185° C. to complete the polymerization reaction. The carboxyester-modified vinylic polymeric composition obtained upon cooling of the reaction mass (hereinafter referred to as "Polymer No. 5") had a ring-and-ball softening point of 143° C. and an acid number of 265, and a weight average molecular weight of 8130.

EXAMPLE 11

For comparison purposes, a rosin-fatty acid vinylic polymer was prepared as follows. To a 500-ml round bottom flask equipped with a stirrer, heating mantle, reflux condenser, and addition funnel was charged 71.6 g of L-5 fatty acid (a tall oil fatty acid available from MeadWestvaco Corp.), 37.5 g of SS rosin (a tall oil rosin available from MeadWestvaco Corp.), and 0.07 g of hypophosphorous acid. The charge was heated with stirring to 175° C., and the addition of a monomer mixture consisting of 74.9 g of styrene, 74.9 g of α-methylstyrene, 92.4 g of acrylic acid, and 3.76 g of di-tert-butyl peroxide was started. The monomer mixture was added over two hours at 173° C. After the monomer addition was complete, stirring was continued for an additional hour at 175° C. Then an additional 0.39 g of di-tert-butyl peroxide was charged, and stirring was continued for an additional two hours at 175° C. to complete the polymerization reaction. The rosin-fatty acid vinylic polymer obtained upon cooling of the reaction mass (hereinafter referred to as the "Comparison Polymer") had a ring-and-ball softening point of 125° C., an acid number of 235, and a weight average molecular weight of 4780.

A latex was produced as follows using the Comparison Polymer as a support resin. To a 200 ml round-bottomed flask fitted with a stirrer, heating mantle, thermometer, and monomer addition pump was charged 409.1 g of deionized water, 104.8 g of the Comparison Polymer, and 20.0 g of 28% aqueous ammonia. The batch was heated with stirring to 70° C. to dissolve the resin. The batch was then heated to 82° C., and a solution of 1.16 g of ammonium persulfate and 0.18 g of 28% aqueous ammonia in 13.6 g of deionized water was charged. Stirring was continued at 82° C. while a monomer feed comprising 99.3 g of styrene, 167.1 g of methyl methacrylate, and 108.3 g of 2-ethylhexyl acrylate and an initiator feed comprising 1.16 g of ammonium persulfate, 0.26 g of 28% aqueous ammonia, and 65.9 g of deionized water were added concurrently over two hours. The batch was then held for thirty minutes at 82° C., a solution of 1.16 g of ammonium persulfate and 0.18 g of 28% aqueous ammonia in 13.6 g of deionized water was charged, and the batch was then held at 82° C. for an additional hour to complete the reaction. The resulting latex had a solids content of 48.1%, a viscosity of 94 cP.

EXAMPLE 12

A latex was produced following the procedure of Example 11, wherein the Comparison Polymer was replaced with Polymer No. 1. The resultant latex had a solids content of 47.7% and a viscosity of 1920 cP (which is a significant increase in viscosity over the latex made with the Comparison Polymer). The latex was tested for resistance to FORMULA 409 (a commercial cleaner available from the Clorox Co.) in the following manner. A sample of the latex was drawn down on a Leneta card with a 3-mil Byrd applicator. The drawdown was allowed to dry for three days at room temperature. Then a drop of FORMULA 409 cleaner was placed on the dried latex film and allowed to stand for 15 minutes. The FORMULA 409 drop was then wiped off, and the degree of etching of the polymer film was rated on a scale of 1–5 (with 1 being essentially complete disruption of the film and 5 being no noticeable effect). The latex made with Polymer No. 1 rated 4 compared with a rating of only 2 for the latex made with the Comparison Polymer.

EXAMPLE 13

A latex was produced following the procedure of Example 11, wherein the Comparison Polymer was replaced with Polymer No. 2. The latex had a solids content of 47.6% and a viscosity of 232 cP. The latex was tested for resistance to FORMULA 409 following the procedure of Example 12 and was rated as 3 compared with a rating of only 2 for the control latex.

EXAMPLE 14

A latex was produced following the procedure of Example 11, wherein the Comparison Polymer was replaced with Polymer No. 3. The latex had a solids content of 47.6% and a viscosity of 153 cP. The latex was tested for resistance to FORMULA 409 following the procedure of Example 12, and was rated as 3 compared with a rating of only 2 for the control latex.

EXAMPLE 15

A latex was produced following the procedure of Example 11, wherein the Comparison Polymer was replaced with Polymer No. 4. The latex had a solids content of 47.5% and a viscosity of 286 cP, considerably higher than the control.

EXAMPLE 16

A latex was produced following the procedure of Example 11, wherein the Comparison Polymer was replaced with Polymer No. 5. The latex had a solids content of 45.0% and a viscosity of 153 cP. The latex was tested for resistance to FORMULA 409 following the procedure of Example 12 and was rated as 4 compared with a rating of only 2 for the control latex.

EXAMPLE 17

A water-based flexographic ink can be made from the latex of Example 12 by stirring together 34 parts by weight of FLEXIVERSE BFD1121 (a phthalocyanine blue pigment dispersion available from Sun Chemical Corp.), 60 parts of the latex of Example 9, 5 parts of PE-392N35 (a polyethylene wax dispersion available from Chemcor Chemical Corp.), and 1 part of DOW 51 (a defoamer available from Dow Chemical Co.).

EXAMPLE 18

A water-based, high-gloss overprint varnish can be made from the latex of Example 12 by stirring together 89 parts by weight of the latex of Example 12, 5 parts of water, 0.1 part of FOAMBLAST 340 (a defoamer available from ROSS Chem Inc.), 3.5 parts of PEW-392N35 (a polyethylene wax dispersion available from Chemcor Chemical Corp.), and 2.4 parts of SURFYNOL 420 (a surfactant available from Air Products and Chemicals Inc.).

EXAMPLE 19

A white architectural paint can be made from the latex of Example 12 as follows. A pigment concentrate can be made by grinding 200 parts by weight of titanium dioxide pigment in a mixture of 100 parts of water, 2 parts of NATROSOL Plus 330 (a rheology modifier available from Hercules, Inc.), 11.1 parts of TAMOL 165A (a dispersant available from Rohm & Haas Co.), 2.2. parts of IGEPAL CTA 639W (a dispersant available from Rhodia), 1.9 parts of 28% aqueous ammonia, and 1 part of BYK 022 (a defoamer available from ByK-Chemie USA). This pigment concentrate can then let down with 29.7 parts of water, 1.9 parts of RHODOLINE 645 (a defoamer available from Rhodia), 587.2 parts of the latex of Example 6, 5.8 parts of SURFYNOL 104DPM (a surfactant available from Air Products and Chemicals Inc.), 9.3 parts of SANTICIZER 160 (a plasticizer available from Solutia Inc.), 23.6 parts of VELATE 368 (a plasticizer available from Velsicol Chemical Corp.), 8.1 parts of NUOCURE CK-10 (a drier available from CONDEA Servo LLC), 1.9 parts of 28% aqueous ammonia, and a solution of 6 parts of POLYPHOBE 115 (a rheology modifier available from Union Carbide Corp.) in 16.7 parts of water.

Many modifications and variations of the present invention will be apparent to one of ordinary skill in the art in light of the above teachings. It is therefore understood that the scope of the invention is not to be limited by the foregoing description, but rather is to be defined by the claims appended hereto.

What is claimed is:

1. A method for producing carboxyester-modified vinylic polymeric compositions which comprises reacting in a free-radical addition polymerization reaction:
   (A) about 40.0% to about 80.0% by total weight of the reactants of a monomer mixture comprising:
      (1) about 15.0% to about 45.0% by total weight of the monomer mixture of a member selected from the group consisting of acrylic acid, methacrylic acid, fumaric acid, maleic anhydride, itaconic acid, and combinations thereof,
      (2) about 55.0% to about 85.0% by total weight of the monomer mixture of a member selected from the group consisting of non-carboxylic acid-containing vinylic monomers and combinations thereof,
      (3) a catalytic amount of polymerization initiator, and
      (4) up to about 4.0% by total weight of the monomer mixture of chain transfer agent; and
   (B) about 20.0% to about 60.0% by total weight of the reactants of a mixture comprising:
      (1) about 40.0% to 100.0% of at least one carboxyester formed by the condensation of at least one hydroxyl-substituted fatty acid and at least one carboxylic anhydride; and
      (2) up to about 60.0% of at least one rosin;
   at a temperature in the range of about 135° C. to about 240° C. to produce a carboxyester-modified vinylic polymeric composition having a weight average molecular weight in the range of about 4,000 to about 20,000 and an acid number in the range of about 160 to about 300.

2. The method of claim 1 which comprises reacting in a free radical addition polymerization reaction:
   (A) about 40.0% to about 80.0% by total weight of the reactants of a monomer mixture comprising:
      (1) about 20.0% to about 35.0% by total weight of the monomer mixture of a member selected from the group consisting of acrylic acid, methacrylic acid, fumaric acid, maleic anhydride, itaconic acid, and combinations thereof,
      (2) about 65.0% to about 80.0% by total weight of the monomer mixture of a member selected from the group consisting of non-carboxylic acid-containing vinylic monomers and combinations thereof,
      (3) a catalytic amount of polymerization initiator, and
      (4) up to about 2.0% by total weight of the monomer mixture of chain transfer agent; and
   (B) about 20.0% to about 60.0% by total weight of the reactants of a mixture comprising:
      (1) about 60.0% to 100.0% of at least one carboxyester formed by the condensation of at least one hydroxyl-substituted fatty acid and at least one carboxylic anhydride; and
      (2) up to about 40.0% of at least one rosin;
   at a temperature in the range of about 145° C. to about 220° C. to produce a carboxyester-modified vinylic polymeric composition having a weight average molecular weight in the range of about 4,000 to about 20,000 and an acid number in the range of about 160 to about 300.

3. The method of claim 1 wherein the carboxyester-modified vinylic polymer composition has a weight average molecular weight in the range of about 5,000 to about 11,000.

4. The method of claim 1 wherein the carboxyester-modified vinylic polymer composition has an acid number in the range of about 180 to about 280.

5. The method of claim 1 wherein the non-carboxylic acid-containing vinylic monomer is a member selected from the group consisting of styrene, substituted styrenes, acrylic esters, methacrylic esters, acrylamides, methacrylamides, acrylonitrile, methacrylonitrile, vinyl esters, vinyl chloride, vinylidene chloride, vinylpyridines, N-vinylamides, vinyl ethers, and combinations thereof.

6. The method of claim 5 wherein the non-carboxylic acid-containing vinylic monomer is a member selected from the group consisting of α-methylstyrene, m-methylstyrene, p-methylstyrene, p-tert-butylstyrene, chlorostyrenes, 3-chloromethylstyrene, 4-chloromethylstyrene, methyl acrylate, ethyl acrylate, butyl acrylate, isobutyl acrylate, cyclohexyl acrylate, 2-ethylhexyl acrylate, isodecyl acrylate, lauryl acrylate, stearyl acrylate, isobornyl acrylate, benzyl acrylate, hydroxyethyl acrylate, hydroxypropyl acrylate, hydroxybutyl acrylate, methoxyethyl acrylate, ethoxyethyl acrylate, phenoxyethyl acrylate, tetrahydrofurfuryl acrylate, glycidyl acrylate, dimethylaminoethyl acrylate, diethylaminoethyl acrylate, methyl methacrylate, ethyl methacrylate, butyl methacrylate, isobutyl methacrylate, cyclohexyl methacrylate, 2-ethylhexyl methacrylate, isodecyl methacrylate, lauryl methacrylate, stearyl methacrylate, isobornyl methacrylate, benzyl methacrylate, hydroxyethyl methacrylate, hydroxypropyl methacrylate, methoxyethyl methacrylate, ethoxyethyl methacrylate, phenoxyethyl methacrylate, tetrahydrofurfuryl methacrylate, glycidyl methacrylate, dimethylaminoethyl methacrylate, diethylaminoethyl methacrylate, tert-butylaminoethyl methacrylate, acetoxyethyl methacrylate, acrylamide, N-methylolacrylamide, N-butoxyethylacrylamide, N,N-dimethylacrylamide, N-isopropylacrylamide, N-tert-butylacrylamide, N-tert-octylacrylamide, diacetone acrylamide, methacrylamide, N-methylolacrylamide, N,N-dimethylacrylamide, vinyl acetate, vinyl propionate, vinyl 2-ethylhexanoate, vinyl neodecanoate, vinyl stearate, N-vinylpyrrolidione, N-vinylcaprolactam, N-vinylformamide, N-vinylacetamide, methyl vinyl ether, ethyl vinyl ether, butyl vinyl ether, decyl vinyl ether, hydroxybutyl vinyl ether, and combinations thereof.

7. The method of claim 1 wherein the polymerization initiator comprises from about 0.2% to about 5.0% by total weight of the monomer mixture and is a member selected from the group consisting of thermal initiators, redox initiators, and combinations thereof.

8. The method of claim 1 wherein the chain transfer agent is a member selected from the group consisting of dodecyl mercaptan, mercaptoacetic acid, mercaptopropionic acid, mercaptosuccinic acid, octyl mercaptan, 2-mercaptoethanol, and combinations thereof.

9. The method of claim 1 wherein the hydroxyl-substituted fatty acid is a member selected from the group consisting of saturated carboxylic acids containing at least one carboxyl group, from one to about three hydroxyl groups, and from 8 to about 24 carbon atoms, unsaturated carboxylic acids containing at least one carboxyl group, from one to about three hydroxyl groups, and from 8 to about 24 carbon atoms, and combinations thereof.

10. The method of claim 9 wherein the hydroxyl-substituted fatty acid is a member selected from the group consisting of 12-hydroxystearic acid, ricinoleic acid, dihydroxystearic acids, aleuritic acid, and mixtures thereof.

11. The method of claim 1 wherein the hydroxyl-substituted fatty acid is 12-hydroxystearic acid.

12. The method of claim 1 wherein the carboxylic anhydride is a member selected from the group consisting of aliphatic compounds containing from one to about three cyclic anhydride groups, cycloaliphatic compounds containing from one to about three cyclic anhydride groups, aromatic compounds containing from one to about three cyclic anhydride groups, and combinations thereof.

13. The method of claim 12 wherein the carboxylic anhydride is a member selected from the group consisting of phthalic anhydride, tetrahydrophthalic anhydride, hexahydrophthalic anhydride, trimellitic anhydride, pyromellitic dianhydride, benzophenonetetracarboxylic dianhydride, norbornenedicarboxylic anhydride, naphthalenedicarboxylic anhydride, succinic anhydride, alkyl-substituted succinic anhydrides, alkenyl-substituted succinic anhydrides, and mixtures thereof.

14. The method of claim 1 wherein a ratio of hydroxyl-substituted fatty acid to carboxylic anhydride in the range of about 0.3 to about 1.2 equivalents of anhydride groups per equivalent of hydroxyl groups is employed in the condensation.

15. The method of claim 14 wherein the ratio of hydroxyl-substituted fatty acid to carboxylic anhydride is in the range of about 0.5 to about 1.1 equivalents of anhydride groups per equivalent of hydroxyl groups.

16. The method of claim 1 wherein the rosin is a member selected from the group consisting of tall oil rosin, formaldehyde-treated tall oil rosin, disproportionated tall oil rosin, hydrogenated tall oil rosin, gum rosin, formaldehyde-treated gum rosin, disproportionated gum rosin, hydrogenated gum rosin, wood rosin, formaldehyde-treated wood rosin, disproportionated wood rosin, hydrogenated wood rosin, and combinations thereof.

17. The method of claim 1 which further comprises the addition of up to about 0.1% by total weight of the mixture of at least one bleaching agent.

18. The carboxylic acid-modified vinylic polymeric composition of claim 1.

19. A latex comprising as a support resin an aqueous solution of the carboxylic acid-modified vinylic polymeric composition of claim 18.

20. An ink comprising the latex of claim 19.

21. The ink of claim 20 wherein the ink further comprises a pigment.

22. A varnish comprising the composition of claim 18.

23. A paint comprising the latex of claim 19.

24. The paint of claim 23 wherein the paint further comprises a pigment.

* * * * *